(No Model.)
T. DIXON.
COMBINED PIPE AND NUT WRENCH.
No. 569,037. Patented Oct. 6, 1896.
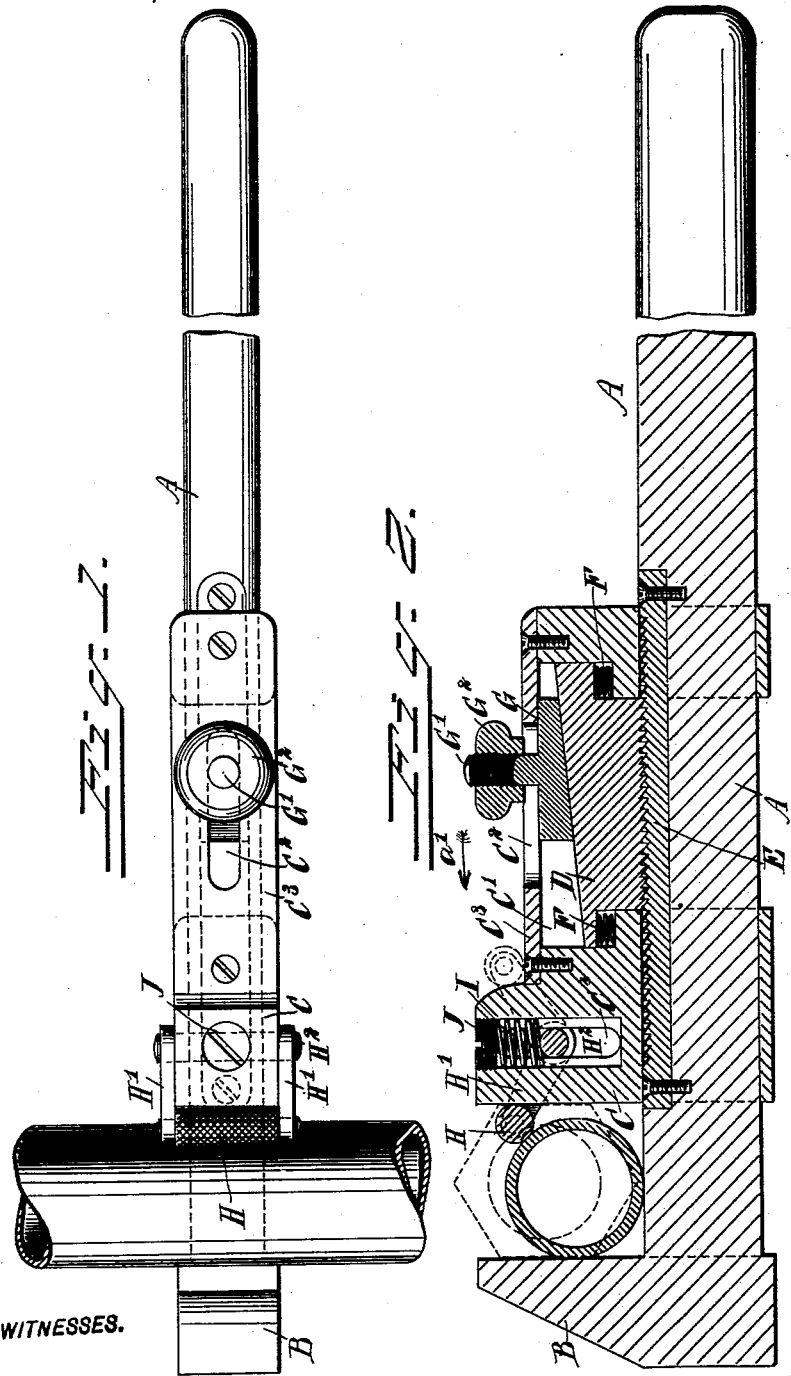
WITNESSES.
Henry T. Hirsch.
INVENTOR
T. Dixon
BY
ATTORNEYS.

UNITED STATES PATENT OFFICE.

THOMAS DIXON, OF McKEESPORT, PENNSYLVANIA.

COMBINED PIPE AND NUT WRENCH.

SPECIFICATION forming part of Letters Patent No. 569,037, dated October 6, 1896.

Application filed March 21, 1896. Serial No. 584,223. (No model.)

*To all whom it may concern:*

Be it known that I, THOMAS DIXON, of McKeesport, in the county of Allegheny and State of Pennsylvania, have invented a new and Improved Combination Pipe and Monkey Wrench, of which the following is a full, clear, and exact description.

The object of the invention is to provide a new and improved combination pipe and monkey wrench which is simple and durable in construction, arranged to permit a quick adjustment of the jaw, and to securely hold the latter in place after proper adjustment is made.

The invention consists principally of a fixed jaw, a removable jaw, and a roller-jaw journaled in arms fulcrumed on said removable jaw.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in both figures.

Figure 1 is a plan view of the improvement applied as a pipe-wrench, and Fig. 2 is a sectional side elevation of the same.

The improved wrench is provided with a handled shank A, formed at one end with a fixed jaw or head B, opposite which is arranged a movable jaw C, fitted to slide longitudinally on the shank A. In the rear part of said movable jaw C is formed a recess C', in which is fitted to slide vertically a block D, carrying on its bottom teeth adapted to mesh into corresponding teeth formed in a rack E, secured in a recess in the top of the shank A. The block D is pressed in an upward direction by springs F, held in the jaw C and engaging lugs on the ends of said block D, so that the latter is normally held out of engagement with the teeth of the rack E to permit of sliding the jaw C longitudinally on the shank A.

The top surface of the block D is inclined, as plainly shown in Fig. 2, and this top is engaged by a wedge G, fitted to slide longitudinally in the recess C', so as to move the block D downward against the tension of the springs F and to move the teeth of the block in engagement with the teeth of the rack E. The wedge G is provided with an upwardly-extending bolt G', passing through a longitudinal slot $C^2$, formed in the cover-plate $C^3$, for closing the recess C', the cover-plate being secured on the top of the rear end of the jaw C.

On the outer end of the bolt G' screws a thumb-nut $G^2$, abutting against the cover-plate $C^3$, said nut when released permitting of conveniently sliding the wedge G forward or backward to move the teeth of the block D in or out of engagement with the rack E. Thus when the wrench is to be used as an ordinary monkey-wrench the operator first loosens the thumb-nut $G^2$, then moves it and the wedge G forward in the direction of the arrow a' to permit the block D to rise out of engagement with the rack E. The jaw C is now free to slide and can be moved forward or backward on the jaw A to the desired position, that is, to cause the distance between the jaws B and C to approximate the size of the article to be acted on by the wrench. When this position has been reached, then the operator moves the wedge G backward in the inverse direction of the arrow a', and then screws down the nut $G^2$ to hold the wedge in place, it being understood that during the rearward movement of the wedge the block D is depressed and its teeth moved in mesh with the rack E.

In order to use the wrench as a pipe-wrench, I provide a roller-jaw H, journaled in arms H', held on a transversely-extending shaft or pin $H^2$, fitted to slide vertically in suitable bearings $C^4$, formed in the front end of the jaw C. A spring I rests on the shaft $H^2$ within a recess in the jaw C, and the top of the spring is engaged by a block J, screwing in the top of the jaw.

Now by reference to Fig. 2 it will be seen that the roller-jaw H is in a rearmost or inactive position during the time the wrench is used as a monkey-wrench, said roller then resting on the cover-plate $C^3$, as indicated in dotted lines in Fig. 2. When, however, it is desired to use the wrench as a pipe-wrench, then the arms H' are swung forward to bring the roller-jaw H in front of the face of the jaw C, as indicated in full lines in Figs. 1 and 2, to permit the roller-jaw to engage the pipe opposite the jaw B and near the top of the pipe, as plainly indicated in the drawings. It is understood, however, that the jaw C is adjustable, as above described, on the shank A to bring the face of the jaw C close to the pipe to be acted on, as shown in Fig. 2. By this arrangement the jaw C is first adjusted according to the size of the pipe, and then the roller-jaw H is adjusted in place for gripping the pipe in conjunction with the fixed jaw B. Thus it will be seen that the wrench can be readily changed from a monkey-wrench to a pipe-wrench, and vice versa.

Having thus fully described my invention, I claim as new and desire to secure by Letters Patent—

1. A wrench, comprising a fixed jaw, a movable jaw on the shank of the fixed jaw and having a recess formed in it, a block in said recess adapted to move transversely of the fixed-jaw shank and having teeth to engage teeth on the shank, a wedge adapted to slide longitudinally of the recess and engage upon a longitudinally-inclined surface of the block, and clamping means for said wedge, substantially as specified.

2. A wrench, comprising a fixed jaw, a jaw movable on the shank of the fixed jaw, clamping means comprising a slidable wedge, a roller-jaw, arms in which said roller-jaw is mounted, a shaft from which said arms extend, the said shaft having bearings in slots in the movable jaw extended parallel with the gripping-face of the movable jaw, a spring engaging on said shaft, and a screw-block in the movable jaw engaging the opposite end of the spring, substantially as specified.

3. A monkey-wrench, comprising a shank carrying a fixed jaw, a movable jaw fitted to slide on said shank, a rack secured on said shank, a spring-pressed toothed block fitted to slide in said movable jaw and adapted to engage the said rack, and a wedge movable on said movable jaw and adapted to engage said toothed block, substantially as shown and described.

THOMAS DIXON.

Witnesses:
   T. D. GARDNER,
   W. J. GERMAN.